(12) United States Patent
Burger et al.

(10) Patent No.: US 6,988,169 B2
(45) Date of Patent: Jan. 17, 2006

(54) CACHE FOR LARGE-OBJECT REAL-TIME LATENCY ELIMINATION

(75) Inventors: Eric W. Burger, Amherst, NH (US);
Matthew D. Womer, West Somerville, MA (US); Bradley James McNiff, Auburn, NH (US)

(73) Assignee: Snowshore Networks, Inc., Chelmsford, MA (US)

( * ) Notice: Subject to any disclaimer, the term of this patent is extended or adjusted under 35 U.S.C. 154(b) by 199 days.

(21) Appl. No.: 10/125,050

(22) Filed: Apr. 18, 2002

(65) Prior Publication Data

US 2003/0051101 A1   Mar. 13, 2003

Related U.S. Application Data

(60) Provisional application No. 60/284,853, filed on Apr. 19, 2001.

(51) Int. Cl.
*G06F 12/00*   (2006.01)

(52) U.S. Cl. ........................... 711/137; 711/167
(58) Field of Classification Search ........... 709/231, 709/234; 710/52–53; 711/120, 137, 167; 725/92, 94, 115; 713/501, 502; 345/534
See application file for complete search history.

(56) References Cited

U.S. PATENT DOCUMENTS

2002/0046307 A1 *   4/2002   Treggiden ..................... 710/52
2002/0103928 A1 *   8/2002   Singal et al. ................. 709/238

OTHER PUBLICATIONS

Florida Center for Instructional Technology, "An Educator's Guide to School Networks", http://fcit.usf.edu/network, 1999, Chap. 5.*
Andrew S. Tanenbaum, Structured Computer Organization, 4th ed., Prentice Hall Inc., 1999, p 8.*
*Proxy Prefix Caching for Multimedia Streams*, Subhabrata Sen, et al., 0-7803-5420-6/99, 1999 IEEE, pp. 1-10.

* cited by examiner

*Primary Examiner*—Pierre M. Vital
(74) *Attorney, Agent, or Firm*—Weingarten, Schurgin, Gagnebin & Lebovici LLP

(57) ABSTRACT

A system and method for reducing data transfer latency and network-induced jitter in computer networks that can handle the transfer of large object data types such as multimedia objects without requiring a large local object store. The system includes a cache memory system coupled between a data consumer and a data provider. The cache memory system includes a jitter buffer and a local object store, each of which is configured to store at least a portion of a requested data object. The cache memory system satisfies the low-latency and low-jitter data feed requirements of the data consumer by delivering initial bytes of the requested data object from the local object store to the data consumer while pre-fetching remaining object data bytes from the data provider using the jitter buffer. The cache memory system then, at least at some times, fetches additional remaining object data bytes from the data provider using the jitter buffer and delivers the additional remaining object data bytes to the data consumer. The system can be used to retrieve, store, and deliver both real-time and non-real-time multimedia objects.

21 Claims, 3 Drawing Sheets

CACHE FOR LARGE-OBJECT REAL-TIME LATENCY ELIMINATION

CROSS REFERENCE TO RELATED APPLICATIONS

This application claims priority of U.S. Provisional Patent Application No. 60/284,853 filed Apr. 19, 2001 entitled CACHE FOR LARGE-OBJECT REAL-TIME LATENCY ELIMINATION.

STATEMENT REGARDING FEDERALLY SPONSORED RESEARCH OR DEVELOPMENT

N/A

BACKGROUND OF THE INVENTION

The present invention relates generally to computer networks, and more specifically to a system and method for reducing data transfer latency and network-induced jitter in computer networks.

Data processing devices such as personal computers and workstations are increasingly called upon to retrieve object data from mass storage devices over computer networks. Because the speed at which such mass storage devices can transfer data objects to data processing devices over networks is limited by various factors including the reliability of the network, the traffic congestion on the network, and the load on the mass storage device, data processing devices typically employ local data storage devices such as cache memory for storing copies of frequently requested data objects. By retrieving stored copies of popular data objects from local cache memory, data processing devices can reduce the level of traffic congestion on the network, the amount of load on mass storage devices, and the latency of the data transfer.

Conventional localized cache types include block caches, file caches, and disk caches. In a typical block cache, data is organized in a plurality of data blocks, each of which has a size larger than that of the object data stored therein. When a data processing device is called upon to retrieve a particular data object, the device attempts to find a copy of the requested data object in one of the data blocks stored in the block cache. In the event the requested data object cannot be found in the local block cache (commonly known as a "cache miss"), the block cache retrieves a block of data including the requested data object from a mass storage device over the network, stores a copy of the retrieved data block in the block cache, and delivers the requested data object to the data processing device. In the event the data object is found in the local block cache (commonly known as a "cache hit"), the block cache delivers the requested data object directly to the data processing device without accessing any data from the mass storage device. It is noted that when the local block cache is full and there is a cache miss, the block cache typically retrieves a data block containing the requested data object from the mass storage device, stores a copy of the data block in the block cache by overwriting data within the block cache, and delivers the requested data block to the data processing device. For example, the block cache may overwrite data currently stored in the block cache based on a least-used algorithm.

In a typical file cache, data is organized in a plurality of files, and when the data processing device is called upon to retrieve a particular data object, it attempts to find the requested data object in one of the files stored in the file cache. In the event of a cache miss, the file cache employs an appropriate filename to retrieve the entire file including the requested data object from a mass storage device over the network, stores a copy of the retrieved file in the file cache, and delivers the requested data object to the data processing device. In the event of a cache hit, the file cache delivers the requested data object immediately to the data processing device without accessing the mass storage device.

In a typical disk cache, data is also organized in a plurality of data blocks. When called upon to retrieve a particular data object, the data processing device attempts to find the requested data object in one of the data blocks stored in the disk cache. In the event of a cache miss, the disk cache retrieves a block of data including the requested data object from a mass storage device such as a disk, stores a copy of the retrieved data block in the disk cache, and delivers the requested data object to the data processing device. In disk caching, not only is the data block containing the requested data object stored in the disk cache, but data blocks in at least one adjacent sector of the disk are also stored in the disk cache (commonly known as "pre-fetching"). In the event of a cache hit, the disk cache delivers the requested data object in a stored or pre-fetched data block immediately to the data processing device without accessing the disk.

One drawback of the conventional localized cache types is that they generally cannot handle retrieval, storage, and delivery of large object data types such as multimedia objects containing audio, video, text, and/or graphics. This is because the size of a single multimedia object can be larger than the total storage capacity of the block, file, or disk cache local to the data processing device.

In an attempt to overcome the limited storage capacity of conventional localized caches, large shared disk resources have been provided on networks at strategic locations for caching large data objects. Further, data streaming techniques have been employed to transfer large data objects over networks from mass storage devices to data processing devices via local caches and/or large shared disk resources. Although these techniques may be successfully used to transfer non-real-time multimedia objects containing text and/or graphics, such techniques often have problems when transferring real-time multimedia objects containing audio and/or video, which generally require a steady rate of data transfer to avoid network-induced jitter in the multimedia data stream. Such jitter can cause intolerable delay and/or distortion upon playback of the audio or video signal.

One way of reducing network-induced jitter in audio data streams is to employ a known data streaming technique that uses a jitter buffer local to a data processing device for storing a sufficient amount of audio data to allow constant playback of the audio signal during worst-case variations in the data transfer rate. For example, if a worst-case variation in the data transfer rate during delivery of an audio data object is 30 msecs, then the above-described data streaming technique may store an amount of audio data corresponding to the first 30 msecs of audio playback in the jitter buffer before playing-back the audio signal. A variable delay having a maximum value of 30 msecs is then applied to the audio data as it passes through the jitter buffer to counteract the variable delay applied to the audio data by the network.

However, such jitter buffers also have drawbacks in that they typically do not store object data with a level of persistence that allows quick delivery of the data upon subsequent data requests. Further, jitter buffers like that employed in the above-described data streaming technique generally increase data transfer latency by the interval of time required to store the initial amount of audio data in the jitter buffer.

It would therefore be desirable to have a system and method for reducing data transfer latency and network-induced jitter in computer networks. Such a system would be capable of handling the transfer of large object data types, e.g., text and graphics for non-real-time applications and audio and video for real-time applications, without requiring a large amount of local data storage.

BRIEF SUMMARY OF THE INVENTION

In accordance with the present invention, a system and method for reducing data transfer latency and network-induced jitter in computer networks is provided that can handle the transfer of large object data types such as multimedia objects without requiring a large local object store. In one embodiment, the system comprises a cache system communicably coupled between at least one data consumer such as a data processing device and at least one data provider such as a mass storage device via one or more links. The cache system includes a jitter buffer and a local object store, each of which is configured to store at least a portion of a requested data object.

When the data consumer makes a request for a particular data object, the data consumer first attempts to find a copy of the requested data object in the cache system. In the event of a cache miss, the cache system retrieves the requested data object from the data provider and stores initial bytes of the data object in the local object store. Once a predetermined number of the initial bytes of the data object is stored in the local object store, the cache system starts delivering the requested object data bytes from the local object store to the data consumer, and simultaneously starts pre-fetching remaining bytes of the data object from the data provider. While fetching the remaining bytes of the data object from the data provider, the cache system buffers the object data bytes using the jitter buffer. The cache system then delivers the remaining bytes of the requested data object from the jitter buffer to the data consumer.

In the event of a cache hit, the cache system immediately starts delivering the initial bytes of the requested data object from the local object store to the data consumer, and simultaneously starts pre-fetching the remaining bytes of the data object from the data provider. While fetching the remaining object data bytes from the data provider, the cache system buffers the object data bytes using the jitter buffer. The cache system then delivers the remaining bytes of the requested data object from the jitter buffer to the data consumer.

By delivering the initial bytes of the requested data object from the local object store to the data consumer while pre-fetching the remaining object data bytes from the data provider using the jitter buffer, the cache system can satisfy the low-latency and low-jitter data feed requirements of the data consumer.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/284,853 filed Apr. 19, 2001 is incorporated herein by reference.

A system and method for reducing data transfer latency and network-induced jitter in computer networks is disclosed that can be used to transfer large object data types such as multimedia objects without requiring a large local object store. In the presently disclosed system, a cache system having a local object store and a jitter buffer is provided, and the initial bytes of a requested data object are delivered from the local object store to a data consumer while remaining bytes of the requested data object are pre-fetched using the jitter buffer.

Figure 1:
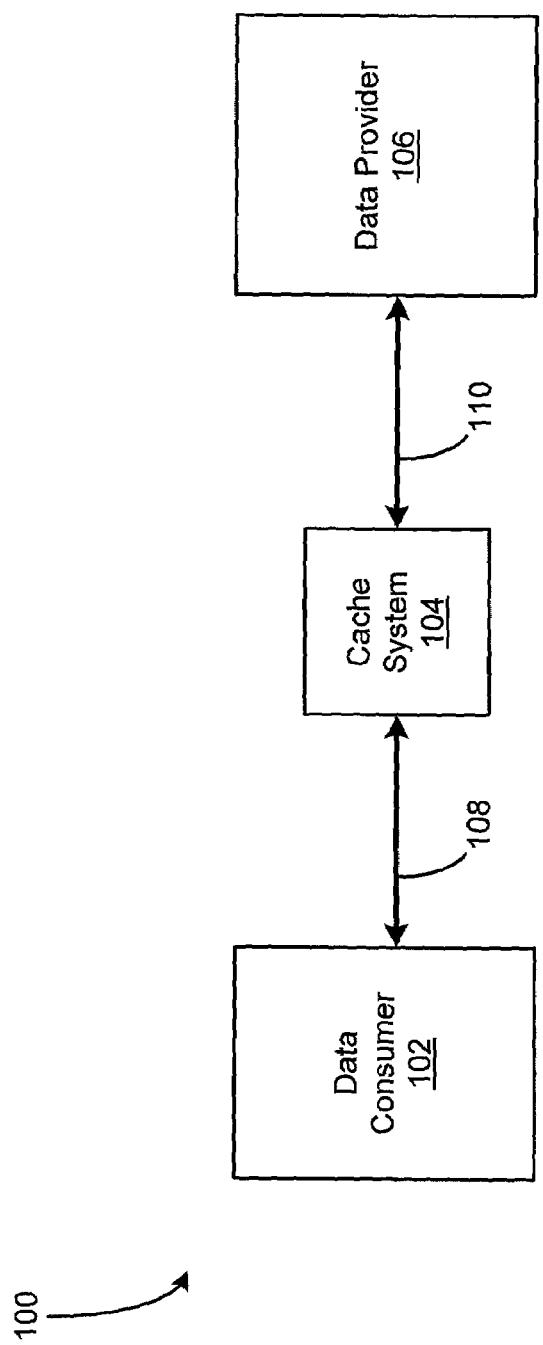
FIG. 1 is a block diagram of a computer network arrangement according to the present invention.

FIG. 1 depicts an illustrative embodiment of a computer network arrangement 100, in accordance with the present invention. In the illustrated embodiment, the computer network arrangement 100 includes a cache memory system 104 communicably coupled between a data consumer 102 and a data provider 106. For example, the data consumer 102 may comprise a data processing device such as a Personal Computer (PC) or a workstation. Further, the data provider 106 may comprise a mass storage device such as one or more floppy disks, hard disks, optical disks, or tapes.

Specifically, the cache system 104 is communicably coupled to the data consumer 102 and the data provider 106 by links 108 and 110, respectively. In the illustrated embodiment, the link 108 comprises a well-characterized, i.e., low-latency link. In this case, "latency" is defined as the interval of time between a request for object data submitted by the data consumer 102 to the cache system 104 and the receipt of a first object data byte at the data consumer 102. For example, the low-latency link 108 may comprise a Peripheral Component Interconnect (PCI) bus, a Small Computer System Interface (SCSI) bus, an engineered Local Area Network (LAN), or any other suitable low-latency link. It is noted that the link 110 may comprise a lower quality link such as a link providing long latency or variable inter-block arrival time (also known as "jitter"), or a link incapable of satisfying data requests reliably within required time intervals. For example, the lower quality link 110 may comprise an Ethernet LAN, a Wide Area Network (WAN), the Internet, or any other suitable lower quality link.

It is appreciated that the links 108 and 110 may comprise different physical media or respective portions of the same physical medium. Further, a plurality of data consumers may be connected to the link 108, and a plurality of data providers may be connected to the link 110. FIG. 1 depicts the single data consumer 102 coupled to the link 108 and the single data provider 106 coupled to the link 110 for clarity of discussion.

The data consumer 102 is operative to submit requests over the link 108 for object data stored by the data provider 106. In the presently disclosed embodiment, the object data requested by the data consumer 102 includes large object data types such as multimedia objects containing audio, video, text, and/or graphics. In an alternative embodiment, the data consumer 102 may submit such object data requests over a separate control link (not shown). The cache system 104 is operative to intercept the object data requests submitted by the data consumer 102 over the link 108 using, e.g., a conventional cache interface protocol such as the Internet Cache Protocol (ICP), and subsequently fetch bytes of the requested data object from the data provider 106 via the link 110. In an alternative embodiment, the cache system 104 may be operative to receive commands directly from the data consumer 102 for fetching the requested data object bytes from the data provider 106.

Figure 2:
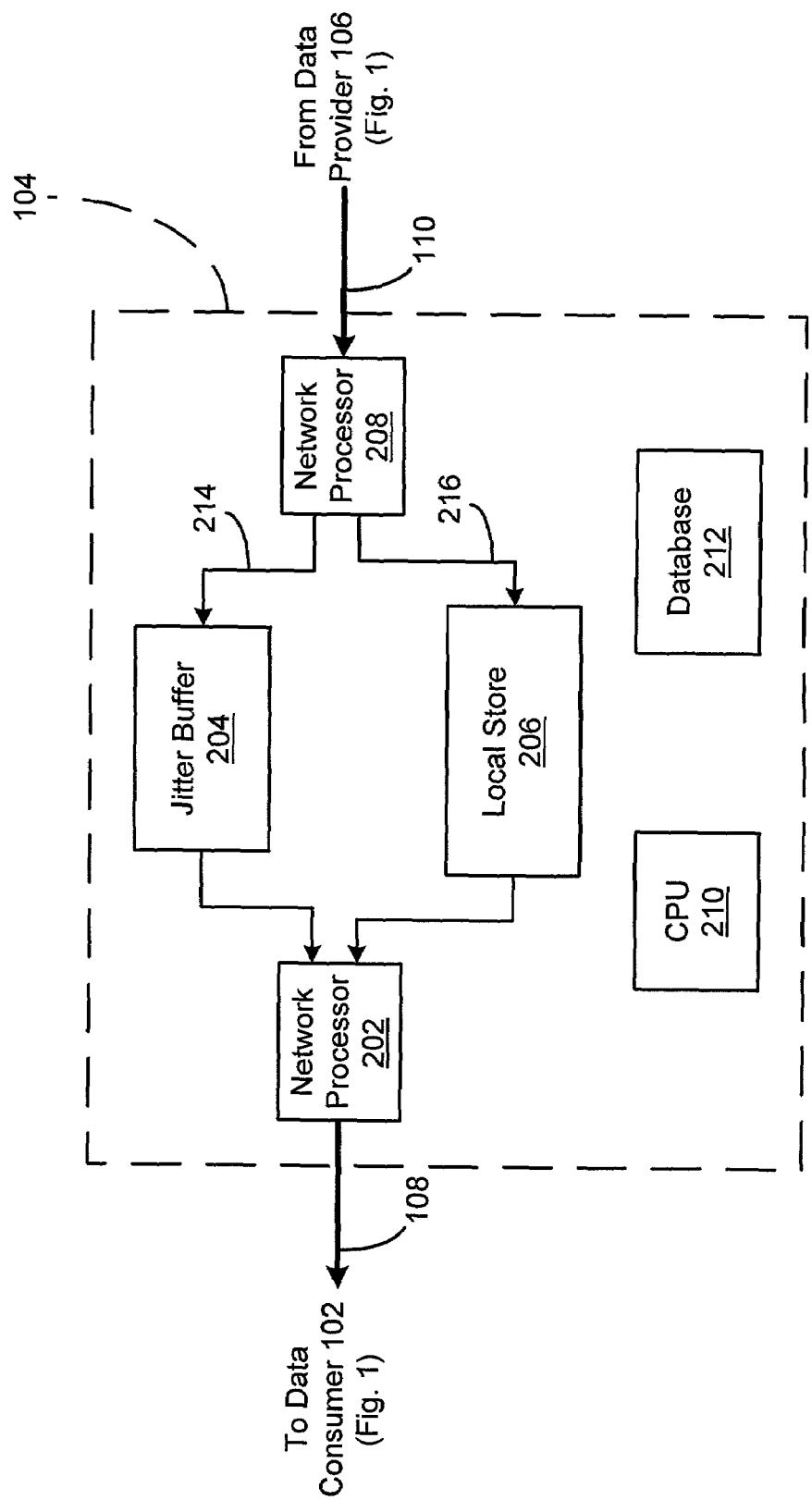
FIG. 2 is a block diagram of a cache system included in the computer network arrangement of FIG. 1.

FIG. 2 depicts an illustrative embodiment of the cache system 104 included in the computer network arrangement 100 (see FIG. 1) In the illustrated embodiment, the cache system 104 includes a network processor 202, a jitter buffer 204, a local object store 206, a network processor 208, a Central Processing Unit (CPU) 210, and a database 212. Specifically, the network processors 202 and 208 are operative to establish and control connections to the links 108 and 110, respectively. It is understood that the data consumer 102 and the data provider 106 are also configured to establish and control connections to the respective links 108 and 110. Further, the CPU 210 is operative to execute systems and applications software for, e.g., receiving object data requests submitted by the data consumer 102, receiving and carrying out commands sent by the data consumer 102, fetching requested object data bytes from the data provider 106, and delivering the requested object data bytes to the data consumer 102.

As shown in FIG. 2, the jitter buffer 204 is connected to each of the network processors 202 and 208. Similarly, the local object store 206 is connected to each of the network processors 202 and 208. Both the jitter buffer 204 and the local object store 206 comprise read/write memory such as Random Access Memory (RAM). Specifically, the local data store 206 comprises read/write memory suitable for storing a predetermined number of initial bytes of one or more requested data objects to satisfy low-latency data feed requirements of the data consumer 102. This predetermined number of object data bytes can be determined using one of several approaches described below. Further, the jitter buffer 204 comprises read/write memory suitable for storing sufficient amounts of remaining bytes of the requested data object to satisfy low-jitter data feed requirements of the data consumer 102. An appropriate size of the jitter buffer 204 can be determined using conventional buffer algorithms such as the buffer algorithm of P. V. Rangan and H. M. Vin.

The computer network arrangement 100 (see FIG. 1) including the cache system 104 (see FIGS. 1–2) will be better understood with reference to the following illustrative example. In this example, the data consumer 102 establishes a connection to the link 108, and submits at least one request over the link 108 for one or more large data objects such as multimedia objects stored by the data provider 106. Further, the cache system 104 intercepts the object data request submitted by the data consumer 102.

In the event of a cache miss (i.e., the requested data object cannot be found in the cache system 104), the cache system 104 retrieves the requested data object from the data provider 106 over the link 110. Specifically, the network processor 208 establishes a connection to the link 110, and the CPU 210 controls the fetching of the predetermined number of initial bytes of the requested object data from the data provider 106 for subsequent storage in the local object store 206 via a link 216.

Once the predetermined number of initial bytes of the requested data object is stored in the local object store 206, the cache system 104 starts delivering the initial object data bytes to the data consumer 102 over the link 108. Specifically, the network processor 202 establishes a connection to the link 108, and the CPU 210 controls the delivery of the initial object data bytes to the data consumer 102.

While the cache system 104 delivers the initial object data bytes to the data consumer 102, the CPU 210 controls the pre-fetching of remaining bytes of the requested object data from the data provider 106 for subsequent storage in the jitter buffer 204 via a link 214. The cache system 104 stores sufficient amounts of the remaining object data bytes in the jitter buffer 204 to counteract potential variable delays (jitter) applied to the requested object data by the network. The cache system 104 then delivers the remaining object data bytes to the data consumer 102 over the link 108.

In the event of a cache hit (i.e., the initial bytes of the requested object data can be found in the cache system 104), the cache system 104 immediately starts delivering the initial bytes of the requested object data from the local object store 206 to the data consumer 102. While the cache system 104 delivers the initial object data bytes to the data consumer 102, the CPU 210 controls the pre-fetching of the remaining bytes of the requested object data from the data provider 106 for storage in the jitter buffer 204. The cache system 104 then delivers the remaining object data bytes from the jitter buffer 204 to the data consumer 102.

In the presently disclosed embodiment, each time the cache system 104 stores initial bytes of a requested data object in the local object store 206, the CPU 210 generates a record for the stored data object, and inserts the record in the database 212. TABLE I depicts an illustrative record for a requested data object.

TABLE I

| Object Identifier | Local Object Locator | Bytes Stored | Insert Time | Access Time | Expire Time |
|---|---|---|---|---|---|
| file:/u /f_server /f_path /f_name | 27 | 32000 | 12 Nov. 2000 17:23:34 | 20 Nov. 2000 09:28:22 | 1 Jan. 2038 23:59:59 |

In the illustrated record, the "Object Identifier" is a token that can be used by the data consumer 102 (see FIG. 1) to request a data object. For example, the Object Identifier may comprise a Uniform Resource Locator (URL), a host name and path, or other suitable object addressing information. In TABLE I, the Object Identifier "file:/u/f_server/f_path/f_name" corresponds to a file accessible using the Network File System (NFS) protocol.

The "Local Object Locator" field indicates to the cache system 104 how to find a local copy of the requested data object in the local object store 206. For example, the Local Object Locator may comprise a byte offset ("pointer") into a memory array or a local pathname to a file. In TABLE I, the Local Object Locator "27" corresponds to a byte offset into the local object store 206.

The "Bytes Stored" field indicates the predetermined number of bytes (or blocks) of the requested data object that are stored in the cache system 104. In TABLE I, the number of Bytes Stored "32000" corresponds to the number of initial bytes of the requested data object stored in the local object store 206.

The "Insert Time" field indicates the date and time when the cache system first makes a copy of the requested data object. In TABLE I, the Insert Time "12 Nov. 2000 17:23:34" corresponds to the date and time when the cache system 104 first copied the initial bytes of the requested data object in the local object store 206.

The "Access Time" field indicates the date and time when the cache system last delivered the requested data object to the data consumer. In TABLE I, the Access Time "20 Nov. 2000 09:28:22" corresponds to the date and time when the cache system 104 last delivered the initial bytes of the requested data object to the data consumer 102.

The "Expire Time" field indicates the time after which the stored copy of the requested data object is to be declared invalid, thereby assuring cache coherency. In the illustrated embodiment, the cache system 104 periodically checks the validity of each stored data object. For example, the cache system 104 may employ the cache coherency algorithm described in HTTP 1.1 for periodically checking data object validity. In TABLE I, the Expire Time "1 Jan. 2038 23:59:59" corresponds to the date and time after which the copy of the requested data object stored in the local object store 206 is to be declared invalid by the cache system 104.

As mentioned above, each record stored in the database 212 includes an indication (Bytes Stored) of the predetermined number of initial bytes (or blocks) of the requested data object stored in the local object store 206. In the illustrated embodiment, while the cache system 104 delivers the initial bytes of a requested data object to the data consumer 102, the cache system 104 starts pre-fetching the remaining bytes of the requested data object from the data provider 106 at some point after the beginning of the data object, as dictated by the Bytes Stored indication included in the database record. For the illustrative record shown in TABLE I, the cache system 104 starts pre-fetching the remaining bytes of the requested data object at a point 32000 bytes after the beginning of the data object. Data retrieval protocols that allow such data transfers include the NFS protocol and the File Transfer Protocol (FTP).

In the presently disclosed embodiment, the local object store 206 (see FIG. 2) has a size large enough to counteract the data transfer latency and network-induced jitter of the computer network arrangement 100 (see FIG. 1). The size of the local object store 206 can be determined using several approaches that take into account the traffic congestion on the network, the load on the data provider(s), and/or the coding characteristics of coded object data.

A first approach involves programming the cache system 104 with a value representing a fixed number of initial bytes the cache system 104 is to store for each requested data object. It is noted that the fixed number of initial bytes stored for each requested data object may be determined to achieve a desired playback rate of the data, i.e., the number of initial bytes that when played, play for a desired interval of time. This approach is appropriate when the requested data objects have similar compressing/decompressing (codec) rates and similar latency and jitter characteristics. Further, this approach makes the number of data objects stored in the local object store 206 deterministic. For example, the local object store 206 may have a size S, and the cache system 104 may be programmed with a fixed initial object data byte value of s. The number of data objects that can be stored in the local object store 206 is therefore equal to S/s. Accordingly, the local object store 206 may be configured as a simple array of S/s objects, in which each object has a size s.

A second approach involves programming the cache system 104 to store the number of initial bytes received for each requested data object during a fixed interval of time. Again, the number of initial bytes stored for each requested data object during the fixed time interval may be determined to achieve a desired playback rate of the data. This approach is appropriate when latencies from multiple data providers are about the same for all of the data providers. In this case, "latency" is defined as the time interval between an object data request submitted by the cache system 104 and the receipt of a first object data byte (or block) at the cache system 104. For example, the number of initial bytes (1 byte=8 bits) of a requested data object to be stored in the local object store 206 may be calculated by multiplying the fixed time interval (milliseconds) by the bit rate (bits/second) of the data feed and dividing the product by 8. The bit rate of the data feed may be determined using a provisioned table or from the encoding of the data object. For example, some encoding formats such as Microsoft WAV™ have the bit rate encoded in the object header. TABLE II depicts an exemplary fixed time interval and an illustrative mapping of object types to average bit rates, which may be stored in the database 212. It is noted that TABLE II includes a default bit rate for unidentified object types.

TABLE II

| Fixed Time Interval | Object Type | Average Bit Rate |
| --- | --- | --- |
| 200 msecs | G.711 | 64000 b/s |
| 200 msecs | G.726 | 32000 b/s |
| 200 msecs | MPEG-2 | 1500000 b/s |
| 200 msecs | Default | 5600 b/s |

A third approach involves programming the cache system 104 to store the number of initial object data bytes received during a fixed time interval based on the identity of the data provider. This approach is appropriate for well-characterized networks in which multiple data providers can have different associated latencies. For example, a label such as a hostname or an Internet Protocol (IP) address for Transmission Control Protocol (TCP)/IP networks may be employed to identify the data provider. TABLE III depicts an illustrative mapping of data provider labels to time intervals, which may be stored in the database 212. It is noted that TABLE III includes a data provider label with a wild card notation (*.close.net) to simplify table management, and a default label for unidentified data providers.

TABLE III

| Data Provider Label | Time Interval |
| --- | --- |
| myhost.company.com | 10 msecs |
| yourhost.nearby.com | 200 msecs |
| slow.anynet.com | 2500 msecs |
| *.close.net | 750 msecs |
| Default | 500 msecs |

In TABLE III, "myhost.company.com" is the label of a data provider having a guaranteed low latency, as indicated by the relatively short time interval (10 msecs) allotted for receiving the initial object data bytes. The data provider "yourhost.nearby.com" also has relatively low latency, as indicated by its associated time interval (200 msecs). However, the data provider "slow.anynet.com" has a relatively high latency, as indicated by the relatively long time interval (2500 msecs) allotted for receiving the initial object data bytes from this data provider. For example, the data provider slow.anynet.com may have a high associated latency because of network congestion or because the data provider itself is slow.

A fourth approach involves programming the cache system 104 to keep track of actual latencies between the cache system 104 and the respective data providers. This approach is appropriate for networks in which multiple data providers have different associated latencies, and the latencies are not well-characterized. In this case, the cache system 104 may maintain a table similar to TABLE III above that further includes statistics on the latency for each data provider, e.g., the maximum latency, the typical latency, and/or the standard deviation. The cache system 104 can then select an appropriate time interval to store the initial object data bytes based on the latency statistics of the data provider. As mentioned above, the number of initial bytes stored for each requested data object during the selected time interval may be determined to achieve a desired playback rate of the data.

It is noted that in each of the above-described approaches for determining the size of the local object store 206, the time interval(s) allotted for receiving initial bytes of a requested data object is sufficient to counteract both the data transfer latency and the network-induced jitter of the computer network arrangement 100 (see FIG. 1). Because latency (i.e., the time to the arrival of a first data block) and jitter (i.e., the variation of inter-block arrival times) are independent quantities, the above-described fourth approach preferably keeps track of actual latencies and jitter separately, and selects the appropriate time intervals to store the initial object data bytes based on both quantities.

Figure 3:
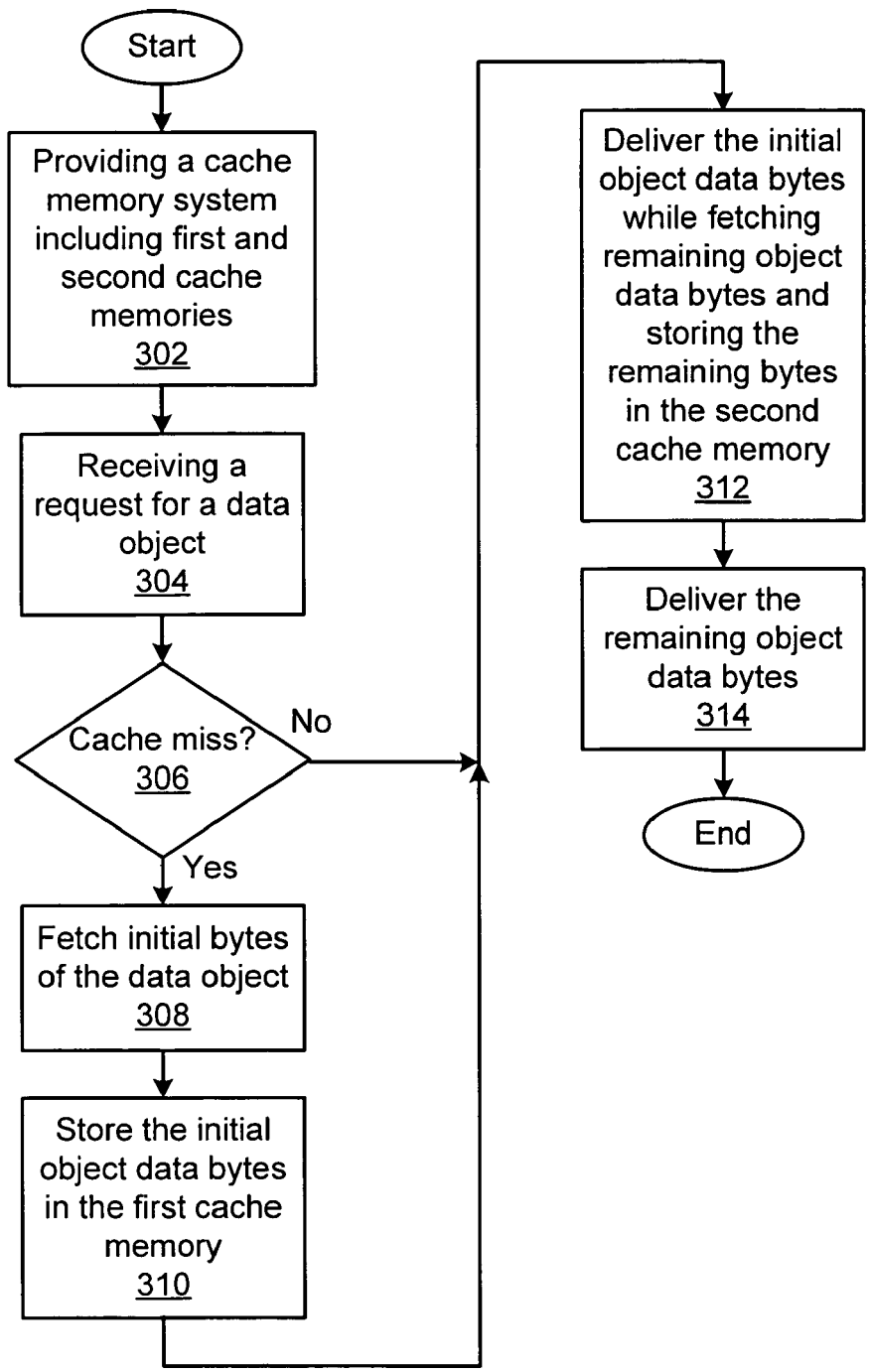
FIG. 3 is a flow diagram of a method of operating the computer network arrangement of FIG. 1 to reduce data transfer latency and network-induced jitter.

A method of operation of the computer network arrangement 100 (see FIG. 1) for reducing data transfer latency and network-induced jitter is illustrated by reference to FIG. 3. First, a cache memory system is provided, as depicted in step 302, including a first cache memory and a second cache memory. The cache memory system is communicably coupled to at least one data processing device and at least one data storage device. A request for at least one data object is then received, as depicted in step 304, from the data processing device by the cache memory system. Next, a determination is made, as depicted in step 306, as to whether a cache miss has occurred. In the event a cache miss has occurred, a predetermined number of initial bytes of the requested data object is fetched, as depicted in step 308, from the data storage device by the cache memory system. The initial object data bytes are then stored, as depicted in step 310, in the first cache memory by the cache memory system. Next, the initial object data bytes are delivered, as depicted in step 312, to the data processing device while fetching remaining bytes of the requested data object from the data storage device and storing the remaining object data bytes in the second cache memory by the cache memory system. Finally, the remaining object data bytes are delivered, as depicted in step 314, to the data processing device by the cache memory system.

Having described the above illustrative embodiment, other alternative embodiments or variations may be made. For example, it was described that the cache system 104 (see FIG. 2) includes the jitter buffer 204 and the local object store 206. It is noted that the local object store 206 may comprise a dual-ported memory that serves as a jitter buffer for the initial bytes of requested object data. The jitter buffer 204 then pre-loads subsequent object data bytes as the local object store 206 satisfies the initial data feed requirements of the data consumer.

It was also described that the jitter buffer 204 and the local object store 206 receive object data from the network processor 208 over the respective links 214 and 216 (see FIG. 2), thereby allowing the jitter buffer 204 and the local object store 206 to be filled in parallel. However, the links 214 and 216 may alternatively comprise a single bus, in which case the jitter buffer 204 and the local object store 206 may not be filled in parallel.

In addition, it was described that the cache memory system 104 is communicably coupled between the data consumer 102 and the data provider 106 (see FIG. 1). However, such a computer network arrangement was described above merely for purposes of illustration. In an alternative embodiment, the cache memory system 104 may be an integral part of the data consumer 102. For example, the above-described method of operation may be performed as a cache algorithm for a data consumer that comprises a web browser. It is understood that other suitable computer network arrangements are possible.

In addition, it was described that the data consumer 102 is operative to submit requests for object data stored by the data provider 106. In an alternative embodiment, the source of the requests is a script, and the cache memory system 104 is configured to pre-process the script. By pre-processing the script, the cache memory system 104 can be further configured to pre-fetch bytes of a plurality of requested data objects in parallel from the data provider 106 comprising a large object cache.

It will further be appreciated by those of ordinary skill in the art that modifications to and variations of the above-described system and method for reducing data transfer latency and network-induced jitter in computer networks may be made without departing from the inventive concepts disclosed herein. Accordingly, the invention should not be viewed as limited except as by the scope and spirit of the appended claims.

What is claimed is:

1. A method of transmitting a data object over a computer network, comprising the steps of:

receiving a request for at least one data object from a data processing device by a cache memory system, the cache memory system including a first cache memory and a second cache memory, the cache memory system being communicably coupled to the data processing device and at least one data storage device, wherein the first cache memory comprises a local object store operative to store a predetermined number of initial units of the requested data object, and wherein the second cache memory comprises a jitter buffer operative to counteract variable delays applied to remaining units of the requested data object by the computer network;

in the event of a cache miss, fetching the predetermined number of initial units of the requested data object from the data storage device and storing the initial data object units in the local object store by the cache memory system, the predetermined number of fetched data object units being based on latency characteristics between the cache memory system and the at least one data storage device, and delivering the initial data object units from the local object store to the data processing device, while fetching the remaining units of the requested data object from the data storage device and storing the remaining data object units in the jitter buffer by the cache memory system;

in response to a cache hit, delivering the initial data object units from the local object store to the data processing device, while fetching the remaining data object units from the data storage device and storing the remaining data object units in the jitter buffer by the cache memory system; and delivering the remaining data object units from the jitter buffer to the data processing device by the cache memory system, wherein the at least one data storage device comprises a plurality of data storage devices, wherein, in the event the latency characteristics between the cache memory system and the respective data storage devices are substantially the same, the predetermined number of fetched data object units corresponds to a number of data object units provided by the data storage device during a fixed interval of time, and wherein, in the event the latency characteristics between the cache memory system and at least some of the respective data storage devices are different, the predetermined number of fetched data object units corresponds to a number of data object units provided by the data storage device during a variable interval of time.

2. The method of claim 1 further including the step of executing a script including commands for fetching remaining units of a plurality of requested data objects in parallel from the data storage device by the cache memory system.

3. The method of claim 1 further including the steps of, at least at some times, fetching additional remaining units of the requested data object from the data storage device by the cache memory system, storing the additional remaining data object units in the jitter buffer by the cache memory system, and delivering the additional remaining data object units to the data processing device by the cache memory system.

4. The method of claim 1 wherein the receiving step includes receiving a request for at least one data object from the data processing device by the cache memory system, the cache memory system including the local object store, the jitter buffer, and a database, and further including the step of generating a record for the initial data object units stored in the local object store by the cache memory system, the record including at least one field selected from an object identifier field, a local object locator field, a number of data units stored field, an insert time field, an access time field, and an expire time field.

5. The method of claim 4 wherein the second fetching step includes fetching the remaining units of the requested data object at a point after the beginning of the data object based on a value in the number of data units stored field of the database record.

6. The method of claim 1 wherein the at least one data object comprises a plurality of data objects, wherein the respective data objects have associated codec rates, jitter characteristics, and latency characteristics, and wherein, in the event the codec rates, jitter characteristics, and latency characteristics associated with the respective data objects are substantially the same, the predetermined number of fetched data object units corresponds to a predetermined fixed number of initial units of the respective data object.

7. A system for transmitting a data object over a computer network, comprising:

at least one data processing device;

at least one data storage device; and a cache memory system communicably coupled to the data processing device and the data storage device, the cache memory system including a first cache memory and a second cache memory, wherein the first cache memory comprises a local object store operative to store a predetermined number of initial units of a requested data object, and wherein the second cache memory comprises a jitter buffer operative to counteract variable delays applied to remaining units of the requested data object by the computer network, wherein the cache memory system is configured to receive a request for at least one data object from the data processing device, in the event of a cache miss, to fetch the predetermined number of initial units of the requested data object from the data storage device, the predetermined number of fetched data object units being based on latency characteristics between the cache memory system and the at least one data storage device, to store the initial data object units in the local object store, and to deliver the initial data object units to the data processing device, while fetching the remaining units of the requested data object from the data storage device and storing the remaining data object units in the jitter buffer, in response to a cache hit, to deliver the initial data object units from the local object store to the data processing device, while fetching the remaining data object units from the data storage device and storing the remaining data object units in the jitter buffer, and to deliver the remaining data object units from the jitter buffer to the data processing device, wherein the at least one data storage device comprises a plurality of data storage devices, wherein, in the event the latency characteristics between the cache memory system and the respective data storage devices are substantially the same, the predetermined number of fetched data object units corresponds to a number of data object units provided by the data storage device during a fixed interval of time, and wherein, in the event the latency characteristics between the cache memory system and at least some of the respective data storage devices are different, the predetermined number of fetched data object units corresponds to a number of data object units provided by the data storage device during a variable interval of time.

8. The system of claim 7 wherein the cache memory system is further configured to execute a script including commands for fetching remaining units of a plurality of requested data objects in parallel from the data storage device.

9. The system of claim 7 wherein the cache memory system is further configured to, at least at some times, fetch additional remaining units of the requested data object from the data storage device, store the additional remaining object data units in the jitter buffer, and deliver the additional remaining object data units to the data processing device.

10. The system of claim 7 wherein the cache memory system further includes a database, and the cache memory system is further configured to generate a record for the initial object data units stored in the local object store, the record including at least one field selected from an object identifier field, a local object locator field, a number of data units stored field, an insert time field, an access time field, and an expire time field.

11. The system of claim 7 wherein the at least one data object comprises a plurality of data objects, wherein the respective data objects have associated codec rates, jitter characteristics, and latency characteristics, and wherein, in the event the codec rates, jitter characteristics, and latency characteristics associated with the respective data objects are substantially the same, the predetermined number of fetched data object units corresponds to a predetermined fixed number of initial units of the respective data object.

12. The system of claim 7 wherein the predetermined number of initial data object units is variable.

13. The system of claim 7 further including a low-latency first link communicably coupling the data processing device and the cache memory system, and a second link communicably coupling the data storage unit and the cache memory system.

14. The system of claim 13 wherein the first and second links comprise different physical media.

15. The system of claim 13 wherein the first and second links comprise respective portions of the same physical medium.

16. The system of claim 13 wherein the second link communicably couples the data storage unit to the local object store and the jitter buffer.

17. The system of claim 13 further including a third link communicably coupling the data storage unit to the local object store, the second link communicably coupling the data storage unit to the jitter buffer.

18. The system of claim 13 wherein the first link comprises a Local Area Network (LAN).

19. The system of claim 13 wherein the first link comprises a local bus.

20. The system of claim 19 wherein the local bus is selected from a Peripheral Component Interconnect (PCI) bus and a Small Computer System Interface (SCSI) bus.

21. The system of claim 13 wherein the second link is selected from an Ethernet LAN, a Wide Area Network (WAN), and the Internet.

* * * * *